L. H. KEIM.
TRANSMISSION MECHANISM.
APPLICATION FILED AUG. 10, 1918.
1,435,242.
Patented Nov. 14, 1922.
2 SHEETS—SHEET 1.
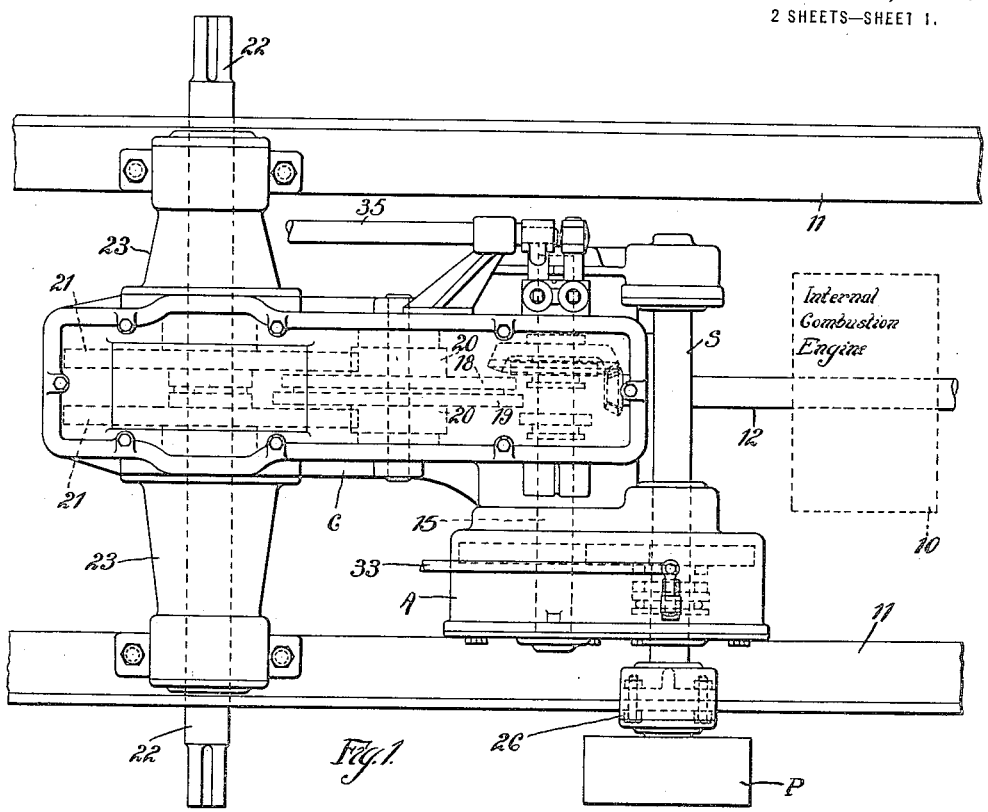
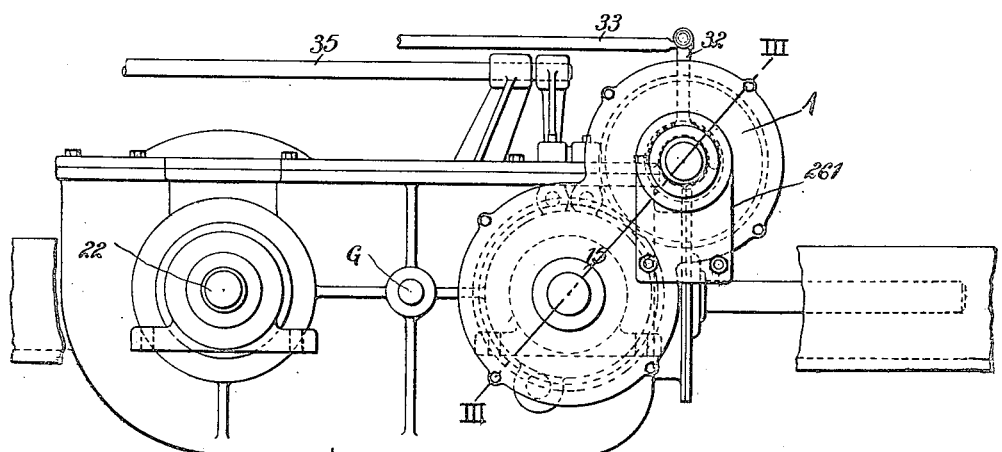
WITNESSES:
J. T. Wurmb
W. B. Wells
INVENTOR
Lester H. Keim
BY
Wesley G. Carr
ATTORNEY

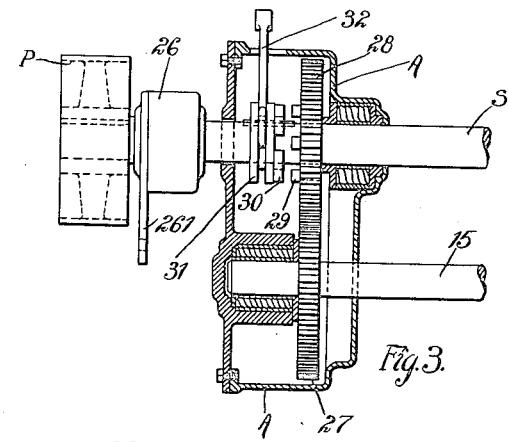
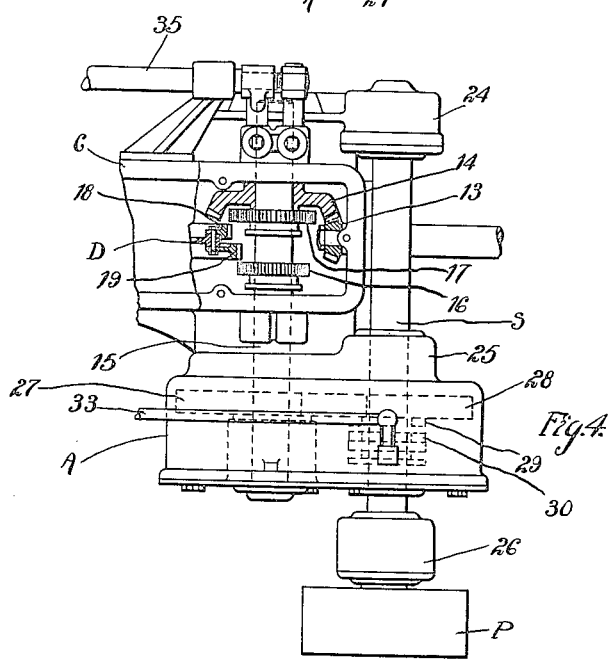

Patented Nov. 14, 1922.

1,435,242

UNITED STATES PATENT OFFICE.

LESTER HOKE KEIM, OF CHICAGO, ILLINOIS, ASSIGNOR TO R. D. NUTTALL COMPANY, A CORPORATION OF PENNSYLVANIA.

TRANSMISSION MECHANISM.

Application filed August 10, 1918. Serial No. 249,319.

*To all whom it may concern:*

Be it known that I, LESTER H. KEIM, a citizen of the United States, and a resident of Chicago, in the county of Cook and State of Illinois, have invented a new and useful Improvement in Transmission Mechanism, of which the following is a specification.

This invention relates to transmission mechanisms adapted for use on farm tractors that are propelled by internal-combustion engines. Such tractors are employed for pulling plows and similar farm implements, and the power plants thereof are utilized to drive such farm machinery as threshers, huskers, balers and similar apparatus when the tractor is stationary.

In order to utilize the power plant for such purposes, it is necessary to employ an auxiliary power shaft which carries a pulley adapted to be belted to the machine to be operated. The pulley should be idle while the tractor is being lined up with the machine to be operated and while the belt is being tightened. Heretofore, the pulley has been held stationary by means of a brake, and clutch mechanism was employed to operatively connect the pulley to the auxiliary power shaft when it was desired to drive the farm machine. This arrangement is not entirely desirable because the auxiliary power shaft is continuously in operation, even while the tractor is employed for plowing, thus causing additional wear.

The object of my invention is to provide an auxiliary power or pulley shaft that may be readily mounted on a standard transmission case, with but slight changes.

Another object of my invention is to provide such an auxiliary shaft that is stationary while the tractor is used for plowing and similar purposes and that can be readily coupled to and uncoupled from the transmission mechanism within the gear case, thus permitting the pulley and its shaft to be stationary or free while the tractor is being lined up and while the belt is being tightened.

Another object of the invention is to mount the auxiliary power shaft considerably higher than the plane of the transmission mechanism so that the belt will be held as high as possible above the ground to keep it from dragging.

The above and other objects and the novel features of the invention will be apparent from the following description, taken in connection with the drawing, in which Figure 1 is a plan view of a part of a farm tractor showing a power transmission mechanism embodying my invention mounted thereon; Fig. 2 is a side elevation of the transmission mechanism, parts of the tractor frame being broken away; Fig. 3 is a sectional view, partly in elevation, taken on the line III—III of Fig. 2 and disclosing means for connecting the auxiliary power shaft and the main driving shaft of the transmission mechanism in the gear case, and Fig. 4 is a plan view of one end of the transmission casing, also disclosing the auxiliary power shaft mounted thereon.

Referring to the drawing, the transmission mechanism embodying my invention is mounted upon the body or frame of a farm tractor or similar vehicle driven by an internal combustion engine 10, (shown in dotted lines) the side members of the frame being indicated at 11. The propeller or transmission shaft 12, extending rearwardly from the engine, projects into the front end of the gear case C and is connected by gear wheels 13 and 14 to a transversely extending driving shaft 15 mounted in suitable bearings in the side walls of the gear case and having one end projecting from the gear case C into an auxiliary gear casing A.

The construction of the gear case C and the arrangement of the power transmitting mechanism therefor is fully described in my copending applications, Serial Nos. 214,810, 214,811 and 214,812, filed February 1, 1918. For the sake of illustration, I have herein shown the power transmitting mechanism of the type illustrated and described in application Serial No. 214,812, in which two change-speed pinions 16 and 17 are slidably mounted on the driving shaft 15 and are adapted to engage the change-speed gear wheels 19 and 18, respectively, carried by the differential mechanism D, mounted on the countershaft G. Pinions 20, connected to the differential elements of the mechanism D, mesh with gear wheels 21 that are keyed to the driving shafts 22 projecting from coaxial openings in the side walls of the gear case C, through sleeves 23, and outside the side frame members 11. The outer ends of the driven shafts or axles 22, 22 are adapted to carry pinions that mesh with internal bull gears on the tractor wheels or they may be directly connected to the hubs of the tractor wheels. The shafts 15, G and 22 are located in the same substantially horizontal plane when the transmission mechanism is mounted on the tractor frame.

The auxiliary power shaft S is mounted in bearings 24 and 25 carried by brackets secured to the sides of the gear casing C and also by bearings 26 carried by a bracket 261 secured to one of the frame members 11. The shaft S is disposed above the plane of the frame and its outer end projects beyond the sides of the frame and carries a pulley P to which farm machinery may be belted. The shaft S is journalled in, and passes through, the auxiliary case A that contains the mechanism by means of which the auxiliary pulley is operatively connected to, and disconnected from, the transmission mechanism within the transmission casing C. The driving shaft 15 projects into the lower portion of the auxiliary case A and has a gear wheel 27 keyed thereto which meshes with a gear wheel 28 on the auxiliary shaft S. The hub of the gear wheel 28 has laterally extending clutch teeth 29 interfitting with the clutch teeth 30 of a shiftable clutch member 31 that is splined on the shaft S. The shifting arm 32 has a forked lower end that engages a groove in the clutch member 31, and the upper end thereof projects outside the case A and is connected to a shift rod 33 which extends to a point where it is accessible to the operator. By this arrangement, the shaft S may be connected to, and disconnected from, the transmission mechanism and, while the tractor is used for plowing, the shaft S may be disengaged from the driving mechanism and thus prevent a waste of power and also prevent wear of the bearings that carry this shaft. Of course, when the shaft S is connected to the power-transmission mechanism in the casing, the change-speed pinions 16 and 17 are disconnected from the gears 18 and 19 by some suitable shifting mechanism operable by the rod 35. The power is then applied to the shaft S from the propeller shaft 12 through the gear wheels 13 and 14, shaft 15 and gear wheels 27 and 28. It will be obvious that the propeller shaft and gear wheels 13 and 14 may be dispensed with when the transmission shaft of the engine is mounted axially in line with the shaft 15 and on that side of the gear case C opposite the auxiliary case A.

It will be understood that various features of this invention may be modified without departing from the spirit of the invention and, therefore, I contemplate such changes as are within the scope of the appended claims.

I claim as my invention:

1. The combination with a transmission casing, of driven shafting projecting therefrom, a propeller shaft projecting into the casing, mechanism, including a countershaft in the casing, for transmitting power from the propeller shaft to said driven shafting, said driven shafting, propeller shafting and countershaft being in the same substantially horizontal plane, an auxiliary power shaft outside said casing above said plane, bearing brackets for said auxiliary shaft secured to the sides of said casing, and means for operatively connecting and disconnecting said auxiliary power shaft to said power-transmitting mechanism.

2. The combination with a transmission casing, of power-transmission mechanism therein, an auxiliary power or pulley shaft outside said casing, bearing brackets for said auxiliary shaft mounted on said casing, means, including gearing, for operatively connecting said auxiliary shaft and the mechanism within said casing, and an auxiliary case enclosing said gearing, said auxiliary casing extending into a plane above the transmission casing.

In testimony whereof, I have hereunto subscribed my name this 22nd day of July 1918.

LESTER HOKE KEIM.